United States Patent [19]

Morii et al.

[11] Patent Number: 5,039,847
[45] Date of Patent: Aug. 13, 1991

[54] IMAGE PROCESSING APPARATUS HAVING AN IMAGE SCANNER

[75] Inventors: Tokuji Morii, Osaka; Sinya Sonoda, Kyoto; Hideki Chujyo, Osaka; Haruyuki Koizumi, Kyoto; Tomoyuki Nakata; Atsushi Iseki, both of Tokyo, all of Japan

[73] Assignee: Omron Corporation, Kyoto, Japan

[21] Appl. No.: 495,031

[22] Filed: Mar. 16, 1990

[30] Foreign Application Priority Data

Mar. 24, 1989 [JP] Japan .................................. 1-72739
Mar. 28, 1989 [JP] Japan .................................. 1-77553

[51] Int. Cl.⁵ .......................................... G06R 15/30
[52] U.S. Cl. .................................... 235/379; 235/380; 235/454
[58] Field of Search ................. 235/379, 380, 454; 382/48, 61

[56] References Cited

U.S. PATENT DOCUMENTS

4,136,821  1/1979  Suguira ............................... 235/380
4,205,780  6/1980  Burns .................................. 235/454
4,464,733  8/1984  Misker ................................ 235/379

*Primary Examiner*—Harold Pitts
*Attorney, Agent, or Firm*—Foley & Lardner

[57] ABSTRACT

Disclosed is an image processing apparatus capable of reading and processing both character data such as bar codes, optical readable letters and marks, and image data such as figures and tables by means of a single image scanner. The image processing apparatus has a parameter registration mode, a code addition mode and an image retrieval mode as operation modes. In the parameter registration mode, when a bar code corresponding to parameters related with image processing is read by the image scanner, a notification signal is outputted in response to completion of the reading. In the parameter registration mode, it is possible to determine priority to be assigned to either setting of the parameters through the image scanner or setting of the parameters through keys. In the code addition mode, a character code based on the character data is added to binary data obtained by individually reading the image data and the character data by means of the image scanner and the data with the added character code is stored in a memory. In the image retrieval mode, when character data for image retrieval is read by the image scanner, the character data is converterd to a character code. Binary data corresponding to the character code is read out from the memory by image retrieval means and outputted to an output unit.

8 Claims, 9 Drawing Sheets

IMAGE PROCESSING APPARATUS HAVING AN IMAGE SCANNER

BACKGROUND OF THE INVENTION

1. Field of the Invention

The present invention relates to image processing apparatus and particularly to an image processing apparatus provided with an image scanner having a function of reading bar codes, marks, letters or other characters, and a function of reading image information of figures, tables, pictures and other image.

2. Description of the Background Art

In order to meet recent demands for labor saving and improvement of operation efficiency in factories, offices, stores etc., studies have been made as to techniques for quantizing documents, drawings, photographs etc., as binary image data (image information to be stored in memory and controlling the data. For example, it is considered to electronically file lists of employees by registering image information of face pictures of employees and registering code information representing the names, posts etc. of the employees. It is also considered in stores and so on to electronically file lists of goods by registering image information of drawings or photographs showing appearances of the goods, and registering code information representing the codes, names, prices etc. of the corresponding goods. In offices, various plans are made to electronically file documents, drawings of design etc.

In a system for controlling and retrieving such image information, binary data of figures, tables, photographs is stored in a storage medium and codes for identifying the respective data are stored corresponding to the respective data. An image scanner using a charge coupled device (CCD) for example is used to register image information in such a system, and a keyboard is used to input identification codes. In such a system, if the image information stored in the storage medium is to be read and outputted to a CRT monitor, a printer or the like, it is necessary to input the identification code corresponding to the image information from the keyboard each time. On that occasion, if the number to be inputted has many digits, the keying operation is troublesome and sometimes a number different from the desired number is inputted erroneously. Thus, the keying operation takes time and often causes inconvenience.

In order to save the trouble of keying operation, it is consider to input identification codes by representing the codes as bar codes, marks or optically readable letters and reading the same. However, the bar codes, marks, optically readable letters and the like are information which can be coded, while image information is information which can not be coded, and in the prior art, there exist no input apparatus capable of reading and processing both the information which can be coded and the information which can not be coded. In addition, processing to make image information correspond to information of bar codes, marks or optically readable letters is not carried out conventionally.

Furthermore, in order to save the trouble of keying operation, it is considered to connect a reader of characters such as bar codes, marks and optically readable letters, and an image scanner individually to a host computer and to store the information read by the reader and the information read by the image scanner by setting a correspondence between the former information and the latter information. However, in such construction, it is necessary to separately use the reader for bar codes, marks, letters, etc. and the image scanner, which can not ensure operability and causes the entire system to be expensive.

In order to process an image read by an image scanner, it sometimes becomes necessary to set parameters for defining an enlargement scale, gradation degrees of the image, and a range to be read or parameters for determining whether a document to be read is to be displayed with half tones as in the case of photographs. To set such parameters, it is considered to convert the information of the parameters to bar codes or to optically readable letters and to read the above mentioned bar codes or letters by means of a reader. However, such parameters are registered in an internal circuit of a control unit performing image processing and accordingly the user can not confirm whether the parameters can be reliably registered or not. More specifically, in the case of reading a bar code for example by a reader, the information of the parameter in the form of the bar code could not be read reliably if the contact on the bar code by the reader is not good. Even in such a case, the user is given no alarm as to erroneous reading cf the parameter and accordingly image processing is performed with the erroneous information, causing troubles such as output of an image different from the desired image to an output unit such as printer.

If it is possible to utilize both the setting of parameters for image processing by means of dedicated keys and the setting of parameters by reading bar codes, optically readable letters or other characters by means of a reader, it will be convenient since parameters can be set more freely. However, in such a case, if setting of a parameter by keys and setting of a parameter based on reading of a bar code or the like by the reader occurs simultaneously, confusion is caused in image processing as to which parameter should be registered and consequently it often happens that a wrong parameter is registered.

In addition, it is considered to transfer the image read by the image scanner to an external unit such as a host computer and to perform various image processing by the external unit. In such a case, if the parameter set in the external unit and the parameter set in the image processing apparatus are different, it sometimes happens that desired image processing can not be smoothly performed even if the image read by the image scanner is transferred to the external unit.

SUMMARY OF THE INVENTION

An object of the present invention is to carry out both of reading of information such as bar codes and reading of image information such as graphs and photographs by means of a single image scanner.

Another object of the present invention is to retrieve image information only by reading information such a bar code without input through keys if desired image information is to be read.

Still another object of the present invention is to confirm whether a parameter is read reliably by an image scanner.

A further object of the present invention is to preset a priority order for setting parameters related with image processing.

A still further object of the present invention is to confirm set parameters by means of an external unit and to set parameters by means of the external unit.

In an image processing apparatus according to the present invention, if a code addition mode is set by a mode setter, an image scanner reads image data of figures, tables or the like and character data of bar codes, letters, marks or the like, and a code adder adds a character code based on the character data to binary image data, so that the two data are stored in a memory. If an image retrieving mode is set by the mode setter, when the image scanner reads character data for image retrieving, a converter converts the character data to a character code. An image retrieving device reads binary image data corresponding to the character code in a memory based on the character code thus obtained by the conversion. The image data is outputted by an output unit.

According to the present invention, reading of character data such as bar codes, optically readable letters or mark cards and reading of image information can be carried out by a single image scanner. Consequently, it is possible to provide a low-cost system with good operability compared with a case of individually providing a reader for bar codes or the like, and an image scanner. In addition, since the information based on the bar codes or the like is stored in the memory corresponding to the read image information, if desired image information is to be read out from the memory, it can be obtained immediately only by reading the bar code or the like by the image scanner without keying operation. Thus, troublesome work of keying operation is saved.

According to another aspect of the invention, when a parameter based on a bar code, optically readable letters or the like is read by the image scanner in a parameter registration mode set by a mode setting key, a notification signal using light, sound or the like is outputted by notifying means such as a lamp or a buzzer in response to completion of the reading. Accordingly, it can be confirmed each time whether the parameter has been read reliably by the image scanner, making it possible to avoid occurrence of erroneous reading.

According to a further aspect of the invention, it is possible to determine in advance by using priority setting keys the priority to be assigned to either setting of parameters by the image pickup means or setting of parameters by the parameter setting keys. For example, if the parameter setting based on a bar code read by using the image pickup means takes priority over the parameter setting by using the parameter setting keys, the setting of the parameter based on the bar code read by the image pickup means is effective and even if a parameter is set by using the parameter setting keys, the command through those keys is not accepted. Thus, simultaneous setting of parameters can be avoided.

According to a further aspect of the invention, data of set parameters for image processing is accessed by an external unit through an interface. Accordingly, if various image processing is to be performed by transferring an image read by the image scanner to an external unit such as a host computer, the parameter of the external unit and that of the image processing apparatus are coincident and therefore it is possible to perform desired image processing smoothly by transferring the image read by the image scanner directly to the external unit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First embodiment

Figure 1:
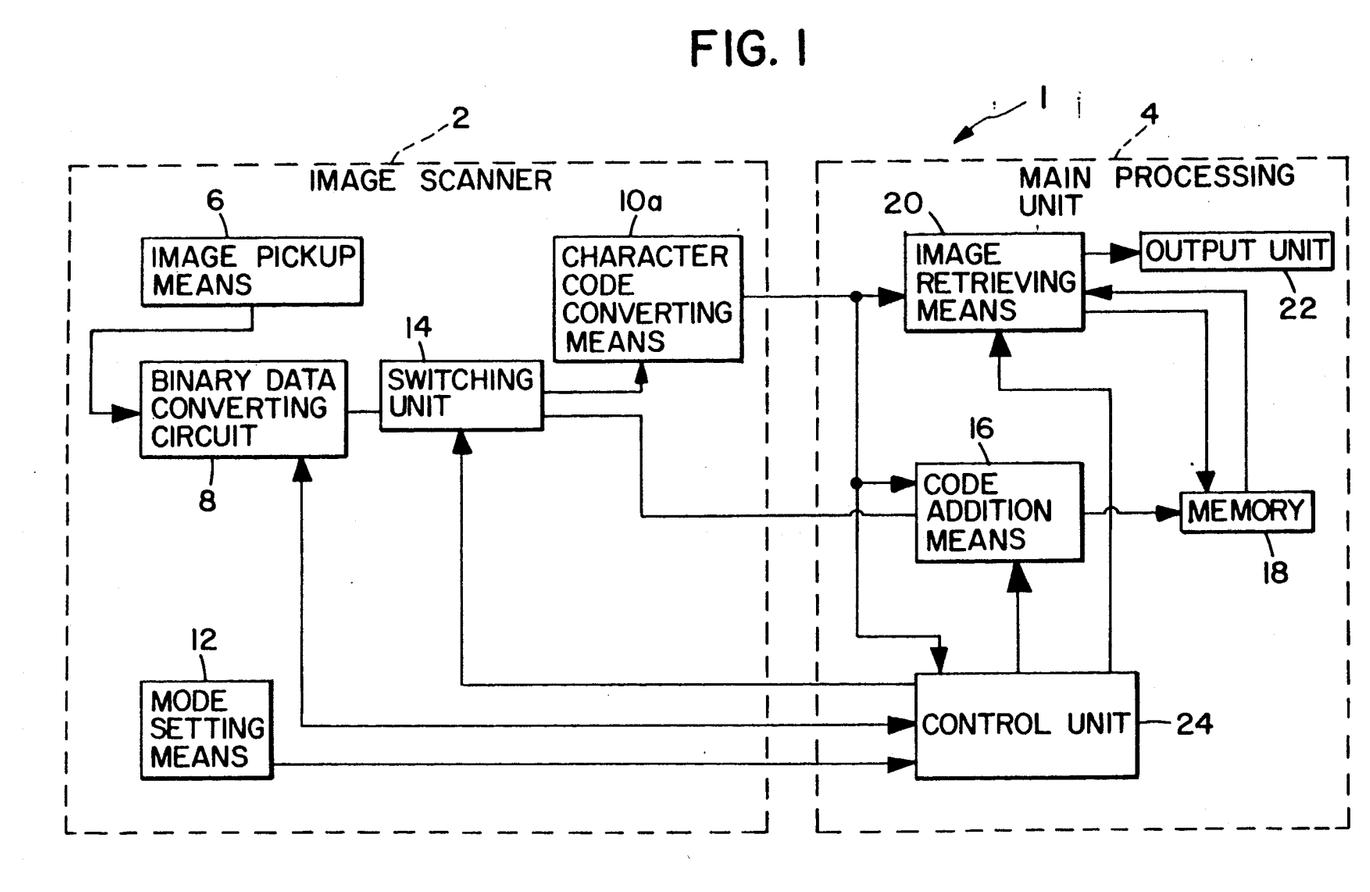
FIG. 1 is a block diagram showing an image processing apparatus according to a first embodiment of the present invention.

Referring to FIG. 1, an image processing apparatus 1 comprises an image scanner 2 for reading image information and bar codes, and a main processing unit 4 for processing the data read by the image scanner 2.

The image scanner 2 comprises: image pickup means 6 having a charge coupled device (CCD) for example; a binary data converting circuit 8 for data converting as binary data image data picked up by the image pickup means 6; character code converting means 10a for converting a bar code picked up by the image pickup means 6 to a character code; mode setting means 12 including a setting switch or the like for outputting mode setting signals to set a code addition mode, an image retrieval mode and a parameter registration mode; and a switching unit 14 for switching connection to the character code converting means 10a and to code addition means 16 to be described afterwards, in response to an output from the mode setting means 12.

An image sensor in the image pickup means 6 may be a one-dimensional solid-state image sensor having light receiving elements arranged in a straight line, or a two-dimensional solid-state image sensor having light receiving elements arranged in a matrix. The image sensor is not limited to the CCD and it may be a MOS device.

The binary data converting circuit 8 in this embodiment has a gradation adjusting function for maintaining an image signal at a prescribed level irrespective of the densities of lines or letters of a document to be read, and a contrast adjusting function for outputting an image signal at a prescribed level irrespective of the tone ratio of a document to be read. By utilizing those adjusting functions, it is possible to pick up an image in a state where it can be recognized most easily. The binary data converting circuit 8 comprises a circuit for correcting irregular conditions of an image, and a floating threshold value circuit for correctly recognizing a blank portion and a mark portion. Thus, the image scanner 2 can obtain pattern information with a higher precision compared with an ordinary bar code reader.

The main processing unit 4 comprises: code addition means 16 including a data buffer for example for adding a character code obtained based on the bar code to binary image data according to the code addition mode set by the mode setting means 12; a memory 18 for storing an output from the code addition means 16; image retrieving means 20 for retrieving and reading image data from the memory 18 based on the bar code picked up by the image pickup means 6 according to the image retrieval mode set by the mode setting means 12; an output unit 22 such as a CRT monitor or a printer for displaying the image data read by the image retrieving means 20; and a control unit 24 for performing parameter registration processing in response to an output from the mode setting means 12, controlling the switching of the switching unit 14, and controlling the operations of the binary data converting circuit 8, code addition means 16 and image retrieving means 20.

Figure 2:
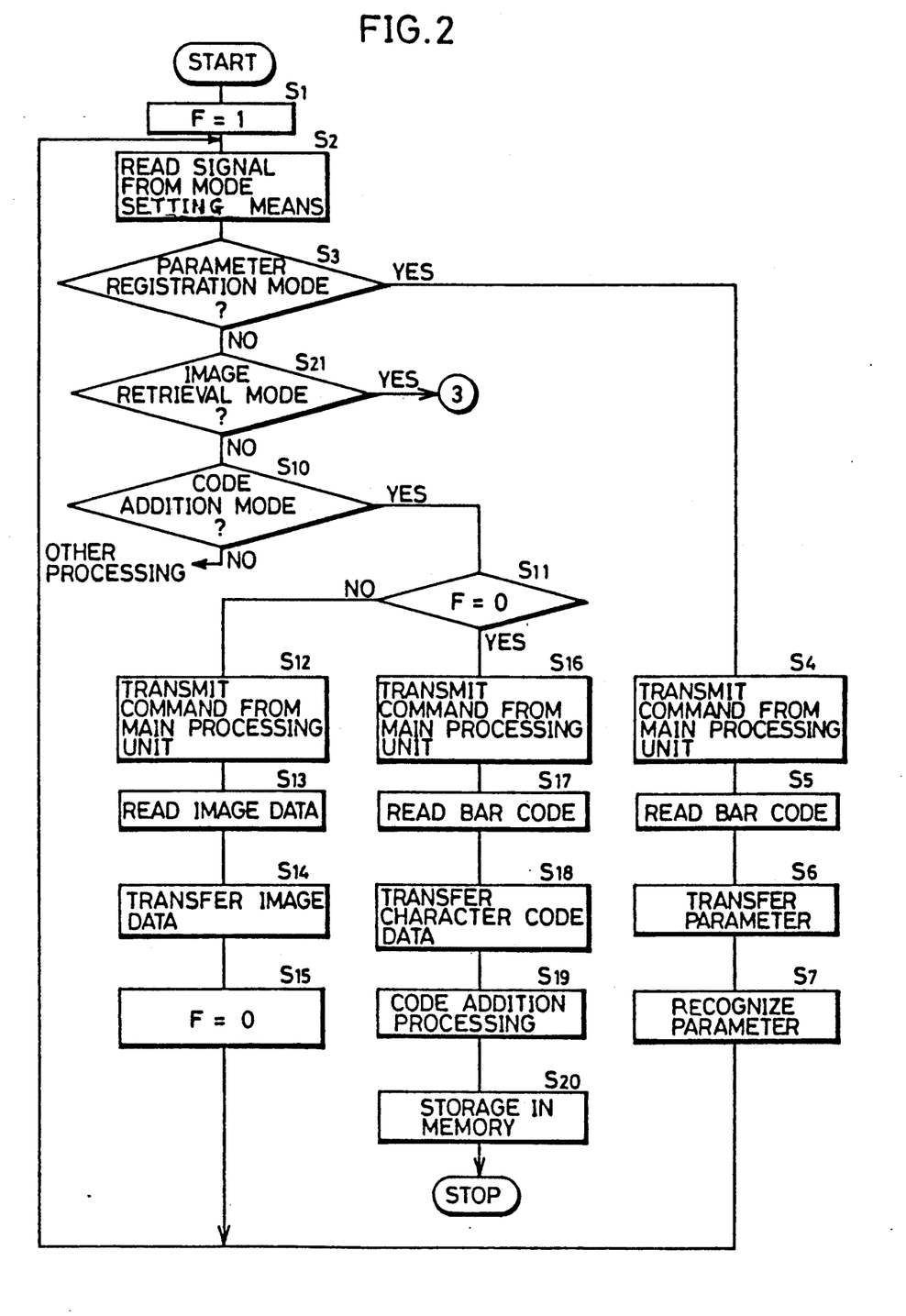
FIG. 2 is a flow chart for explaining operation of the image processing apparatus shown in FIG. 1.
Figure 3:
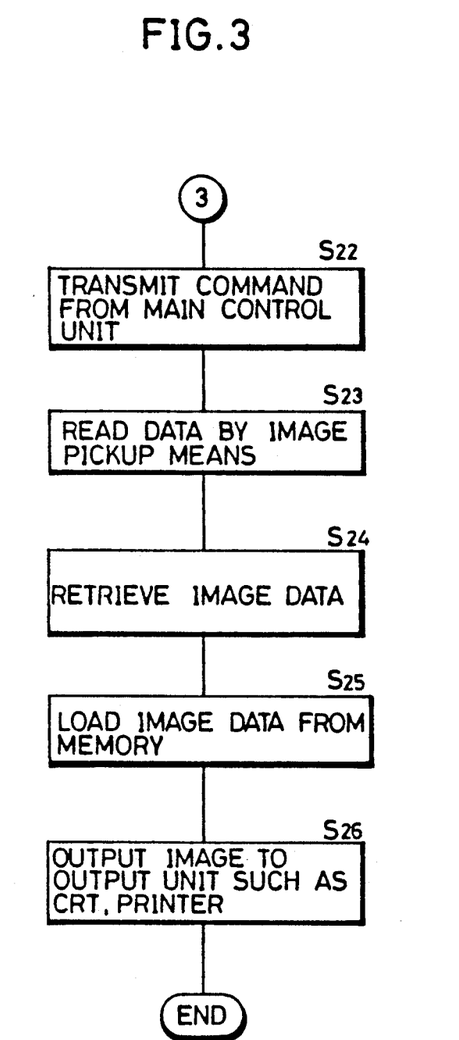
FIG. 3 is a flow chart for explaining operation in an image retrieval mode common to image processing apparatus according to the first to fourth embodiments of the invention.

Next, operation of the image processing apparatus 1 thus constructed will be described with reference to the flow charts of FIGS. 2 and 3.

In order to store information of a bar code in correspondence with image data obtained by pickup of figures, lists or the like, it is necessary to set parameters for defining an enlargement scale, gradation degrees of the image and a range to be read or for determining whether a document to be read is to be displayed with half tones as in the case of photographs (those parameters being hereinafter referred to as "image processing parameters"). For this purpose, when a power supply is turned on, a flag is set to "1"(in step S1) and then a parameter registration mode setting signal is outputted from the mode setting means 12 set to the parameter registration mode. This signal is supplied to the control unit 24 The control unit 24 transmits a switching signal to the switching unit 14 in response to the parameter registration mode setting signal and connects the binary data converting circuit 8 to the character code converting means 10a (in steps S2 to S4). Then, information of various parameters including the above mentioned image processing parameters represented as a bar code is read by the image scanner 2 (in step S5). The information of the bar code is converted to binary image data by the binary data converting circuit 8 and it is transmitted to the character code converting means 10a through the switching unit 14. The character code converting means 10a converts the read bar code information to a corresponding character code for parameter setting. The data of the character code is transferred to the control unit 24 of the main processing unit 4 (in step S6). The control unit 24 recognizes the parameters of the enlargement scale, gradation etc. of the image based on the character codes (in step S7).

In order to add information for image data identification represented as a bar code to, the image data, to be read by the image pickup means 6, the mode setting means 12 is set to the code addition mode. If the image data are for example diagrams, the bar code to be added is for example information representing the numbers of the diagrams When a code addition mode setting signal is applied from the mode setting means 12 to the control unit 24 (in step S10), the control unit 24 determines whether the flag is "0" or not (in step S11). If the flag is "1", the control unit 24 transmits a switching signal to the switching unit 14 in response to the code addition setting signal and connects the binary data converting circuit 8 to the code addition means 16 (in step S12). Then, the image pickup means 6 of the image scanner 2 reads the image of figures, tables or the like (in step S13). The image data is converted to binary image data by the binary data converting circuit 8 and the binary image data is transferred to the code addition means 16 of the main processing unit 4 through the switching unit 14 (in step S14). On that occasion, the control unit 24 stores temporarily the binary image data in the code addition means 16. Further, the control unit 24 sets the flag to "0"(in step S15).

Subsequently, the control unit 24 determines whether the flag is "0" or not (in step S11). If the flag is "0", the connection of the switching unit 14 is switched so as to be connected to the character code converting means 10a (in step S16). Thus, when a bar code to be made to correspond to the image data is read by the, image pickup means 6 of the image scanner 2 (in step S17), the bar code is converted to binary image data by the binary data converting circuit 8 and then it is supplied to the character code converting means 10 through the switching unit 14, so that it is converted to a corresponding character code. The data of the character code is transferred to the code addition means 16 of the main processing unit 4 (in step S18). In response to the transfer timing, the control unit 24 issues a code addition instruction to the code addition means 16 and, in response to this instruction, the code addition means 16 adds the character code corresponding to the read bar code to the image data (in step S19). The data with the added character code is stored in the memory 18 by the control unit 24 (in step S20).

In order to read out desired image data by utilizing a bar code for retrieval of image data, the mode setting means 12 is set to the image retrieval mode. An image retrieval mode setting signal is outputted from the mode setting means 12. When the control unit 24 recognizes this signal (in step S21), it transmits a switching signal to the switching unit 14 (in step S22) and connects the binary data converting circuit 8 to the character code converting means 10a. Then, when the bar code for retrieval of image data is read by the image pickup means 6 of the image scanner 2 (in step S23), the information of the bar code is converted to binary image data by the binary data converting circuit 8 and the binary image data is transmitted to the character code converting means 10a through the switching unit 14. The character code converting means 10a converts the information of the read bar code to a corresponding character code. Then, the data of the character code is transferred to the main processing unit 4. In response to this transfer, the control unit 24 issues a start instruction to the image retrieving means 20 and, in response to this instruction, the image retrieving means 20 retrieves image data corresponding to the character code in the memory 18 based on the inputted character code (in step S24). If image data corresponding to the character code exists, the image retrieving means 20 reads out the image data (in step S25) and transfers it to the output unit 22. Thus, the image corresponding to the bar code read by the image scanner 2 is outputted to the output unit 22 (in step S26).

Embodiment 2

Figure 4:
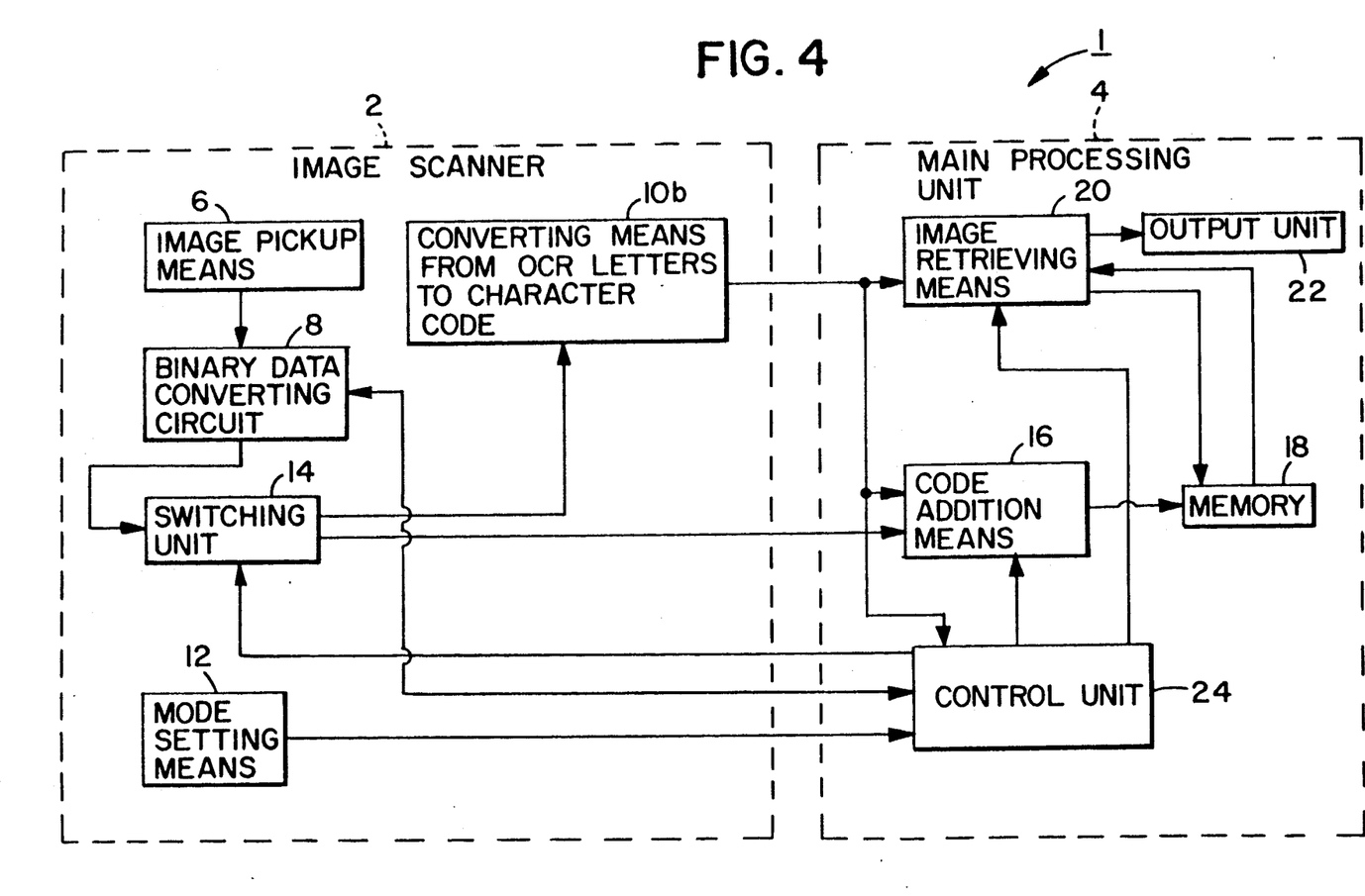
FIG. 4 is a block diagram showing an image processing apparatus according to the second embodiment of the invention.

FIG. 4 is a block diagram of an image processing apparatus according to the second embodiment. A difference in construction from the embodiment 1 is that the second embodiment comprises character code converting means 10b for converting optically readable letters picked up by the image pickup means 6 of the image scanner 2 to a character code. The construction of the other portions is the same as that of the first embodiment and the portions corresponding to those in FIG. 1 are assigned identical reference characters. Therefore, the description thereof is not repeated.

Figure 5:
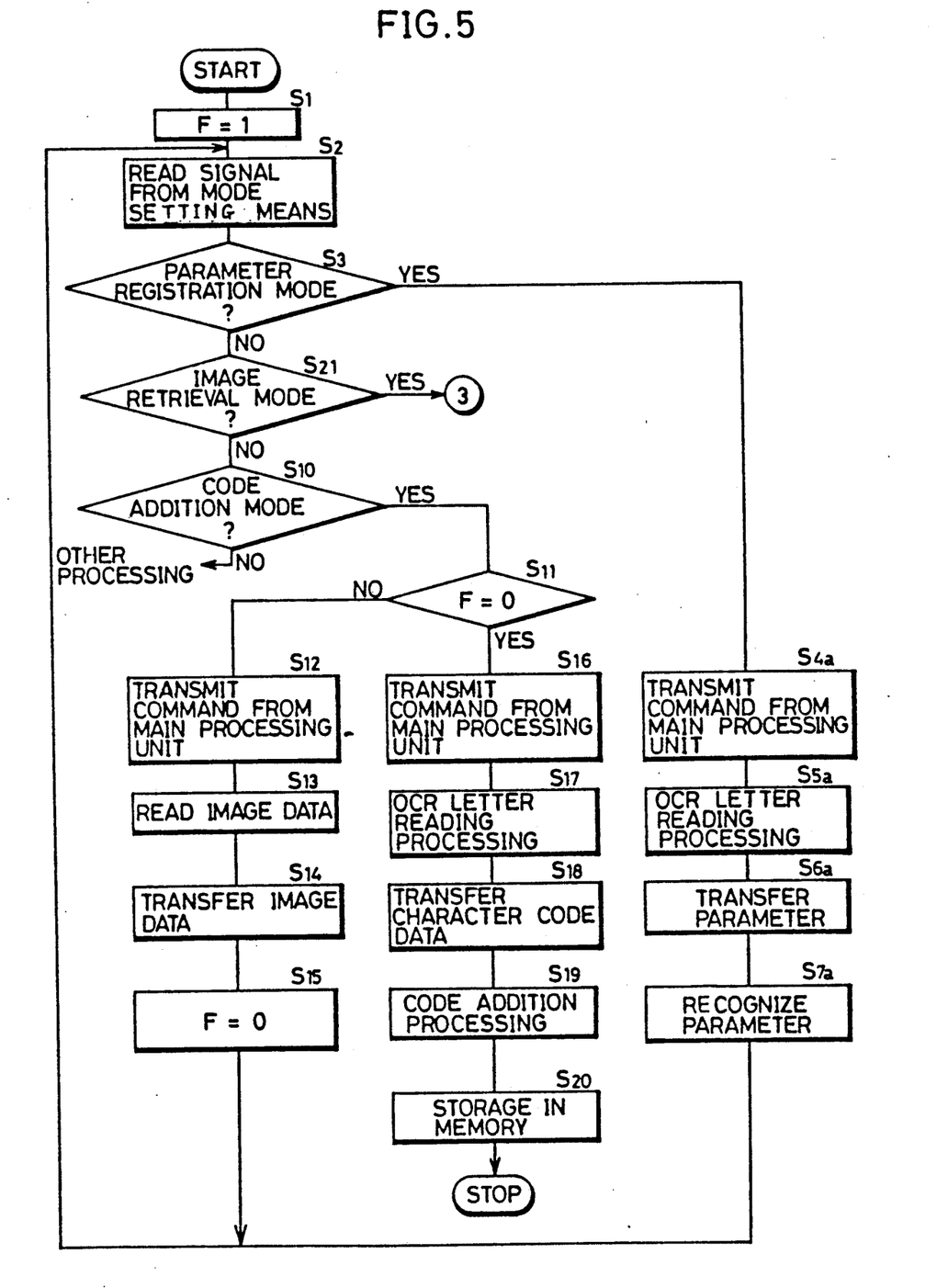
FIG. 5 is a flow chart for explaining operation of the image processing apparatus shown in FIG. 4.

In the image processing apparatus of this second embodiment, as shown in FIG. 5, information of various parameters including the above mentioned image processing parameters represented as optically readable letters is read, whereby the control unit 24 can recognize the parameters (in steps S4a to S7a). The image and the optically readable letters are read by the image scanner 2, whereby a character code based on the optically readable letters is individually added to the image data and stored in the memory 18 (in steps S10 to S20).

In order to read out desired image data, optically readable letters corresponding to an image are read in the same manner as in the first embodiment, whereby the image data corresponding to the letters is read out (in steps S21 to S26).

Third embodiment

This embodiment uses a mark card in which data can be recorded by attaching a mark in a prescribed position on the card.

Figure 6:
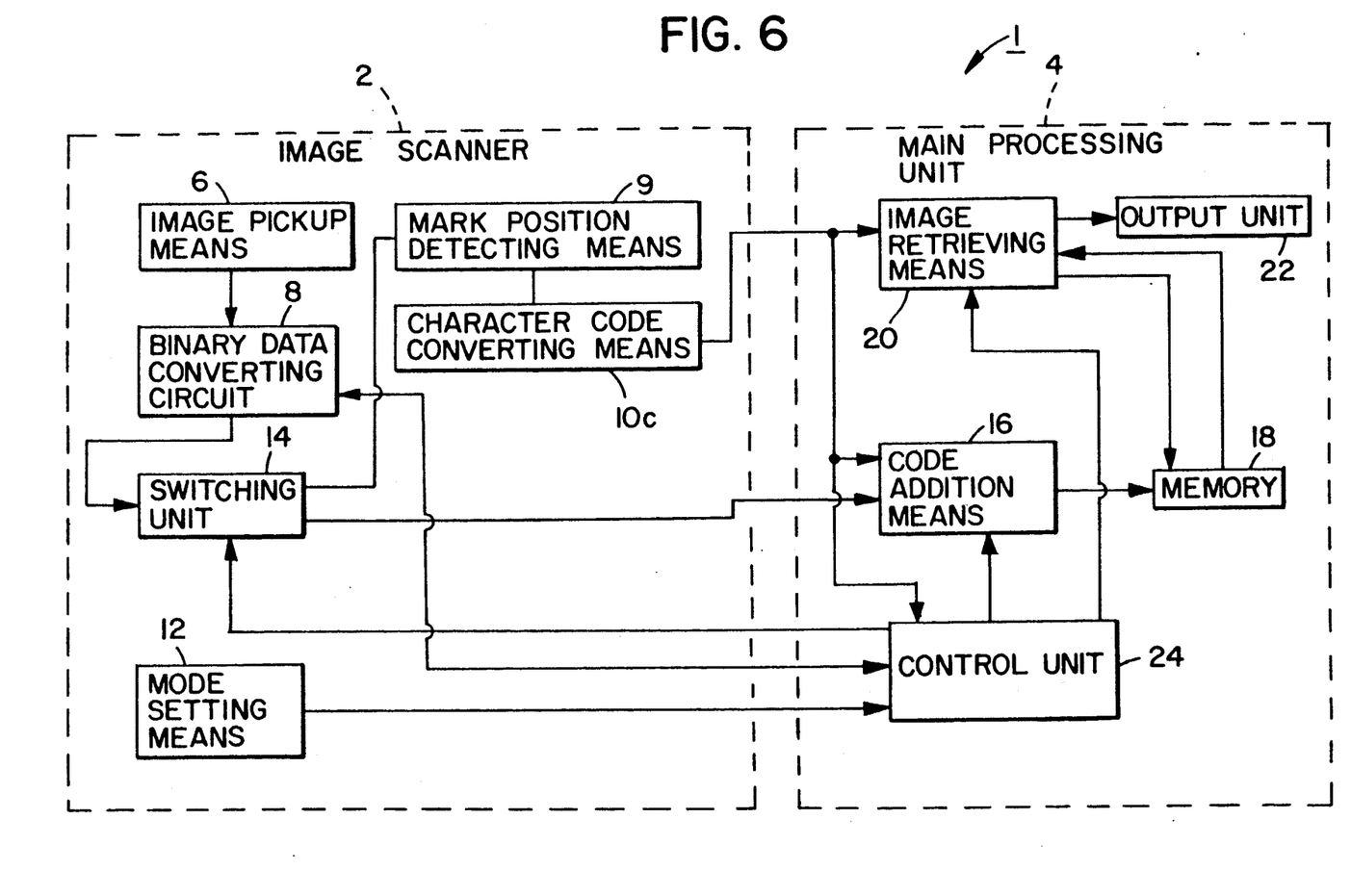
FIG. 6 is a block diagram showing an image processing apparatus according to the third embodiment of the invention.

FIG. 6 is a block diagram of an image processing apparatus according to the third embodiment. A difference in construction of the third embodiment from the first embodiment is that the third embodiment comprises mark position detecting means 9 for detecting a position of a mark on the mark card picked up by the image pickup means 6 of the image scanner 2, and character code converting means 10c for converting the position information of the mark detected by the mark position detecting means 9 to a character code. The construction of the other portions is the same as in the first embodiment and the portions corresponding to FIG. 1 are assigned identical reference characters, the description thereof being not repeated.

Figure 7:
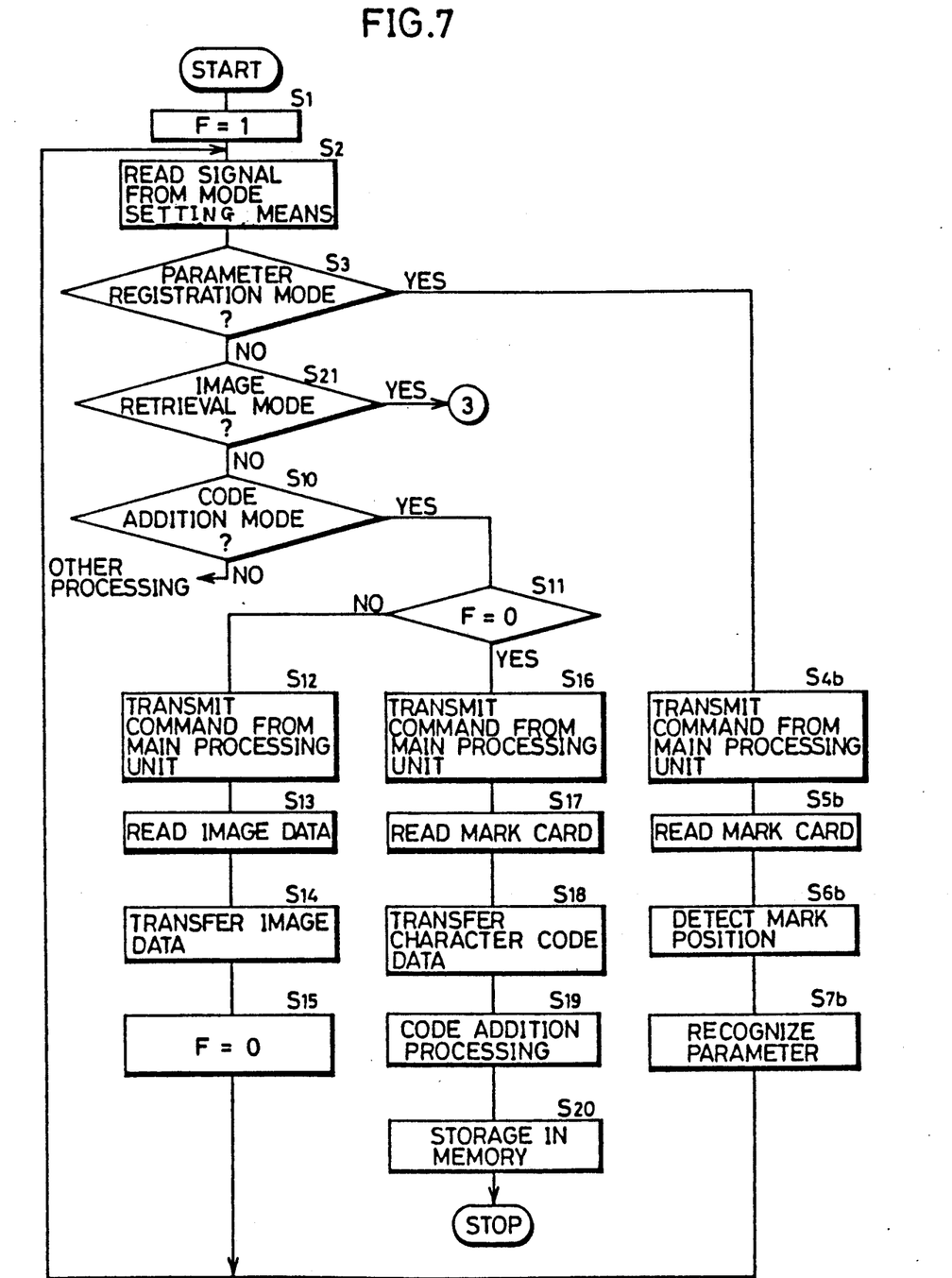
FIG. 7 is a flow chart for explaining operation of the image processing apparatus shown in FIG. 6.

In this third embodiment, as shown in FIG. 7, information of various parameters including the above mentioned image processing parameters is read, whereby the control unit 24 can recognize the parameters (in steps S4b to S7b). The image scanner 2 reads individually the image and the mark card, whereby the character code based on the mark card is individually added to the image data and the data thus obtained is stored in the memory 18 (in steps S10 to S20).

In order to read out desired image data, the mark card is read, whereby the image data corresponding to the mark card is read out (in steps S21 to S26).

Fourth embodiment

Figure 8:
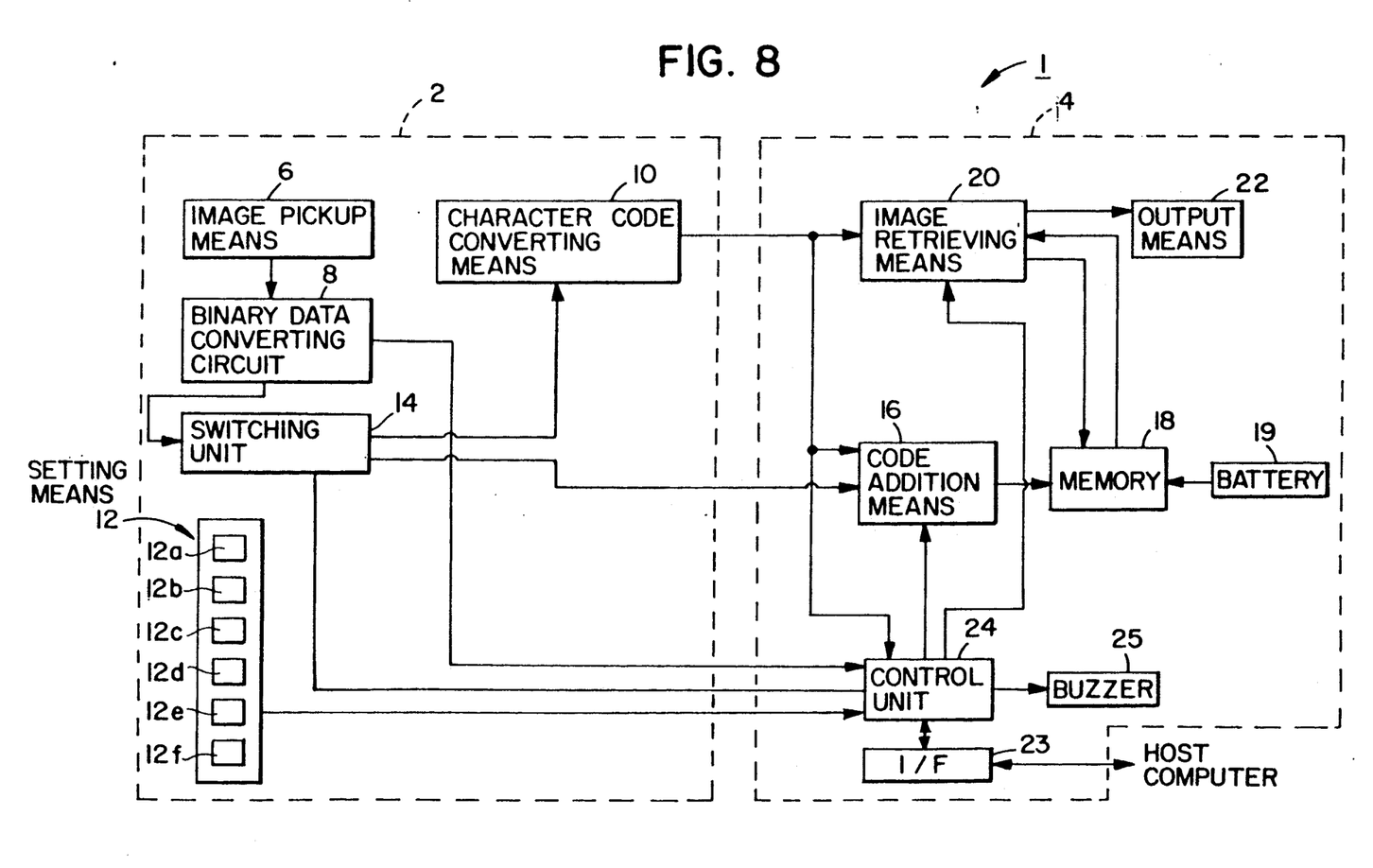
FIG. 8 is a block diagram showing an image processing apparatus according to the fourth embodiment of the invention.

FIG. 8 is a block diagram of an image processing apparatus according to the fourth embodiment. This embodiment has differences in construction from the first embodiment in the below described points. Firstly, the setting means 12 comprises: a code addition mode setting key 12a selected in the case of adding a bar code to image data read by the image pickup means 6; an image retrieval setting key 12b selected in the case of retrieving desired image data based on the bar code read by the image pickup means; a parameter setting key 12c for setting various parameters including the above mentioned image processing parameters; a setting key 12d for setting the parameter registration mode; a priority setting key 12e for determining the priority to be assigned to any of setting of parameters by the image pickup means 6 setting of parameters by the parameter setting key 12c and setting of parameters by an external unit; and a reset key 12f for resetting parameters to initial values. Secondly, the main processing unit 4 comprises: an interface portion 23 for communicating parameters including the above mentioned image processing parameters, between an external unit such as a host computer and the image processing apparatus 1; a control unit 24; and a buzzer 25 as a notifying means. A lamp or the like can be used in place of the buzzer 25.

The other portions have the same construction as that in the first embodiment and the portions corresponding to FIG. 1 are assigned identical reference characters, the description thereof being not repeated.

Figure 9:
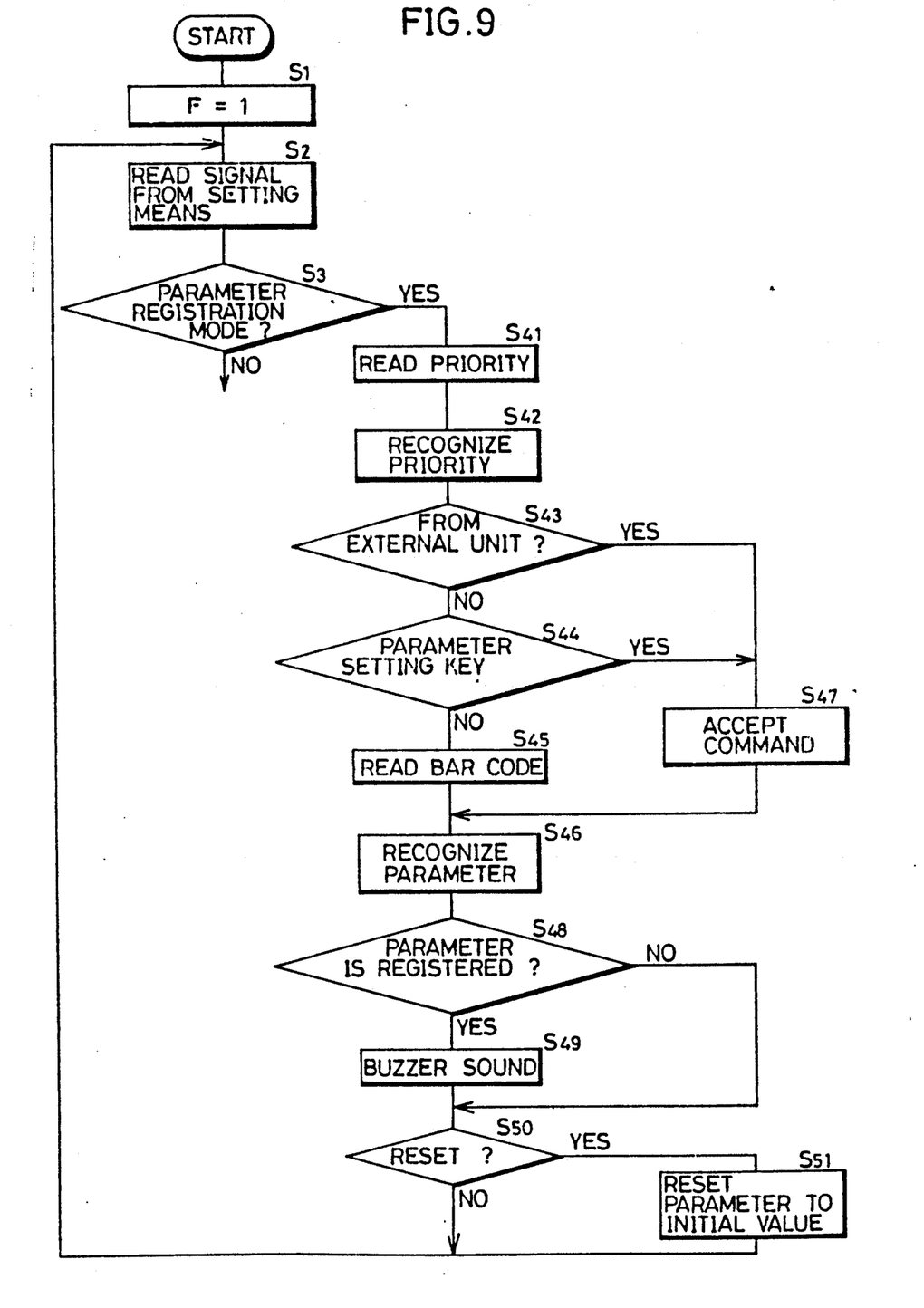
FIG. 9 is a flow chart for explaining operation of the image processing apparatus shown in FIG. 8.

FIG. 9 is a flow chart showing parameter registration processing which constitutes a characteristic feature of the fourth embodiment. The same processing as in the processing shown in FIGS. 2 and 3 is not shown repeatedly in FIG. 9. Referring to FIG. 9, the parameter registration processing in the fourth embodiment will be described.

In order to store information of a bar code in correspondence with image data, it is necessary to set and register in advance parameters including the above mentioned image processing parameters and, in the case of registering those parameters, it is necessary to determine the priority to be assigned to any of setting of the parameters by reading the bar code by the image pickup means 6, setting of the parameters by means of the parameter setting key 12c, and setting of the parameters through the external unit. For those purposes, when the power supply is turned on, the flag is set to "1" at first (in step S1). Next, the parameter registration mode setting key 12c of the setting means 12 is operated, so that the parameter registration mode is set. In the parameter registration mode, the control unit 24 reads a priority setting signal inputted from the priority setting key 12e (in step S41). For example, the priority for setting parameters is determined in the order of designation by the image scanner 2, designation by the parameter setting key 12c, and designation from the external unit. When the control unit 24 recognizes the priority thus determined (in step S42), it waits for input of parameters. If the highest priority is given to registration of parameters by the image scanner 2, the control unit 24 transmits a switching signal to the switching unit 14 so as to connect the binary data converting circuit 8 to the character code converting means 10.

In order to read a bar code by the image pickup means 6 and to register parameters, the image scanner 2 traces the bar code, so that the information of parameters converted as the bar code is read (in step S45). The information of the parameters is converted to binary image data by the binary data converting circuit 8 and the binary image data is transmitted to the character code converting means 10 through the switching unit 14. The character code converting means 10 converts the information of the read bar code to a corresponding character code for parameter setting. The data of the character code is transferred to the control unit 24 of the main processing unit 4 and the control unit 24 recognizes the parameters of the enlargement scale, gradation degrees or the like of the image based on the character code (in step S46). In that case, if the highest priority is assigned by the priority setting key 12e to the designation of parameters by the image scanner 2, the control unit 24 does not accept other command from the external unit or parameter setting key 12c even in the case of setting parameters by the external unit or the parameter setting key 12c (in steps S43 and S44). If the highest priority is assigned to the setting of parameters by the parameter setting key 12c, the command is registered in the control unit 24 (in step S47) but other command for setting parameters from the image pickup means 6 or the external unit is not accepted.

If the control unit 24 recognizes the desired parameters necessary for image processing and registers them in an internal register (in step S48), the control unit 24 outputs a notification signal to the buzzer 25 (in step S49). Thus, the buzzer 25 sounds and the operator becomes aware that the prescribed parameters are reliably registered in the control unit 24. If the buzzer 25 does not sound, it can be determined that an error occurs in reading of the bar code, and the operator uses again the image scanner 2 to trace the bar code, so that the parameters can be read. Even in case where the buzzer 25 sounds after the parameters have been registered, a desired image could not be obtained, if the formats or the like of the parameters are changed In such a case, a reset signal is supplied by using the reset key 12f of the setting means 12 (in step S50), whereby the parameters registered in the control unit 24 are returned to the initial values (in step S51).

This embodiment is related with the case of reading bar codes. However, needless to say, the present invention is also applicable to cases of reading optically readable letters, mark cards or the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising an optical scanner, and a data processor for processing data read by said optical scanner,
    said optical scanner comprising
    image pickup means for picking up character data and image data, and outputting an image signal,
    binary data converting means for converting the image signal from said image pickup means into binary data and outputting the same,
    converting means responsive to the binary data corresponding to the character data from said binary data converting means for converting said binary data to a character code, and
    mode setting means for selectively setting a code addition mode and an image retrieval mode,
    said data processor comprising
    code addition means responsive to the setting of the code addition mode by said mode setting means for adding the character code obtained based on said character data to the binary data corresponding to the image data from said binary data converting means,
    storing means for storing the binary data corresponding to the image data with the character code added by aid code addition means,
    image retrieving means responsive to the setting of the image retrieval mode by said mode setting means for reading out the binary data corresponding to the image data from said storing means, and
    output means for outputting the binary data corresponding to the image data read by said data retrieving means.

2. An image processing apparatus in accordance with claim 1, wherein said character data is a bar code.

3. An image processing apparatus in accordance with claim 1, wherein said character data are letters suited for optical reading.

4. An image processing apparatus in accordance with claim 1, wherein said character data is a mark written on a mark card.

5. An image processing apparatus in accordance with claim 1, wherein
    said mode setting means further comprises a key for setting a parameter registration mode for registering parameters related with processing of data to be read by said optical scanner, and
    said image processing apparatus further comprises notifying means responsive to the setting of the parameter registration mode by said key for outputting a notification signal upon completion of reading of said parameters based on said character data read by said optical scanner.

6. An image processing apparatus in accordance with claim 5, wherein said parameters include data concerning an enlargement scale and gradation degrees of an image to be read.

7. An image processing processing apparatus in accordance with claim 1, wherein
    said mode setting means further comprises
    a key for setting a parameter registration mode for registering parameters concerning processing of data to be read by said optical scanner, and
    a key for instructing priority to be assigned to either setting of the parameters by reading said character data by said image pickup means or setting of the parameters by said parameter registration mode setting key, and
    said image processing apparatus further comprises registration means for performing processing of registration of said parameters according to the priority set by said priority instructing key.

8. An image processing apparatus in accordance with claim 1, further comprising
    interface means for communicating parameters related with processing of data to be read by said optical scanner between said apparatus and an external unit.

* * * * *